United States Patent [19]
Seidner

[11] Patent Number: 5,404,183
[45] Date of Patent: Apr. 4, 1995

[54] MULTIFOCAL CONTACT LENS AND METHOD FOR PREPARING

[76] Inventor: Leonard Seidner, 4 Walden Ct., Manalapan, N.J. 07726

[21] Appl. No.: 40,422

[22] Filed: Mar. 31, 1993

[51] Int. Cl.⁶ .......................... G02C 7/04; A61B 3/00
[52] U.S. Cl. .................... 351/161; 351/177; 351/219; 351/247
[58] Field of Search ............... 351/160 R, 160 H, 161, 351/162, 247, 219, 177

[56] References Cited

U.S. PATENT DOCUMENTS

| | | | |
|---|---|---|---|
| 3,482,906 | 12/1969 | Volk | 351/161 |
| 4,418,991 | 12/1983 | Breger | 351/161 |
| 4,525,043 | 6/1985 | Bronstein | 351/161 |
| 4,636,049 | 1/1987 | Blaker | 351/161 |
| 4,640,595 | 2/1987 | Volk | 351/160 R |
| 4,752,123 | 6/1988 | Blaker | 351/161 |
| 4,765,728 | 8/1988 | Porat et al. | 351/161 |
| 4,883,350 | 11/1989 | Muckenhirn | 351/160 R |
| 4,890,912 | 1/1990 | Visser | 351/161 |
| 4,936,672 | 6/1990 | Capez | 351/161 |
| 4,971,432 | 11/1990 | Koeniger | 351/161 |
| 5,046,836 | 9/1991 | Volk | 351/219 |
| 5,181,053 | 1/1993 | Brown | 351/161 |
| 5,200,773 | 4/1993 | Volk | 351/160 R |

*Primary Examiner*—Scott J. Sugarman
*Attorney, Agent, or Firm*—R. Neil Sudol; Henry Coleman

[57] ABSTRACT

A method for use in preparing a customized multifocal contact lens includes the step of providing a standard diagnostic contact lens having an annular portion with a concave cornea-fitting posterior surface and a central portion with a predetermined convex anterior surface and a concave aspherical posterior surface of predetermined eccentricity. The diagnostic contact lens is placed on the cornea of a patient's eye so that the fitting surface is in substantial contact with the cornea. The diagnostic contact lens is allowed to align itself with the cornea in an off-center position. Upon an alignment of the diagnostic contact lens in the off-center position, two or more test lenses are disposed in series before the patient's eye to determine a power curve with which the anterior surface of the central portion could be formed to provide optimal near and far vision for the patient.

17 Claims, 1 Drawing Sheet

MULTIFOCAL CONTACT LENS AND METHOD FOR PREPARING

BACKGROUND OF THE INVENTION

This invention relates to a method for use in preparing a customized multifocal contact lens. This invention also relates to a multifocal contact lens produced using such a method.

Bifocal contact lenses are designed to correct or compensate for a condition of advancing age known as "presbyopia." In a presbyopic eye, the ability to focus at near distances, such as the normal reading distance is diminished. The loss of focusing capability is due to hardening of the eye's natural crystalline lens material.

Generally, multifocal contact lenses (usually either bifocal, trifocal or aspheric) are concentric or segmented in configuration. In a conventional bifocal contact lens of the concentric type, a first, centrally located, circular correction zone constitutes either distant or near vision correction, while a second annular correction zone surrounding the first zone provides the corresponding near or distance vision correction, respectively. In a conventional bifocal contact lens of the segmented or translating type, the lens is divided into two somewhat D-shaped zones. Usually the upper area is for distant vision correction, whereas the lower area is for near vision correction. Such conventional segmented contact lenses require some sort of shifting of the lens relative to the eye to achieve acceptable visual acuity for both distant and near vision.

The generally accepted method of fitting contact lenses is based on taking so called K readings (which measure the center of the cornea) and fitting the center of the contact lens in a predetermined relationship to those readings.

In all conventional bifocal fitting techniques, the bifocal or multifocal contact lens is optimally designed to be particularly positioned on the cornea. However, it is very difficult in many cases, to position the lens to achieve the required fit.

OBJECTS OF THE INVENTION

An object of the present invention is to provide a method for use in preparing or manufacturing a multiifocal contact lens.

Another object of the present invention is to provide such a method which eliminates the need to pre-position, or predetermine the position of, a customized multifocal lens on the patient's eye.

Yet another object of the present invention is to provide such a method which utilizes a standardized diagnostic or fitting lens having an aspheric posterior surface.

Another, more particular, object of the present invention is to provide such a method which is conceptually simple and easy to implement.

A further object of the present invention is to provide a multifocal contact lens which is not necessarily centered in its normal use position on the eye.

Another particular object of the present invention is to provide such a bifocal contact lens which is made from a standard polymer material having standard surfaces.

Yet another object of the present invention is to provide such a lens which has a central portion with an aspheric posterior surface.

These and other objects of the present invention will be apparent from the drawings and detailed descriptions herein.

SUMMARY OF THE INVENTION

A method for use in preparing a customized multifocal contact lens comprises, in accordance with the present invention, the step of providing a standard diagnostic contact lens having an annular portion with a concave cornea-fitting posterior surface and a central portion with a predetermined convex anterior surface (of known value) and a concave aspherical posterior surface of predetermined eccentricity. The diagnostic contact lens is placed on the cornea of a patient's eye so that the fitting surface is in substantial alignment with an area of the cornea. The diagnostic contact lens is allowed to align itself with that area of the cornea usually in an off-center position. After settling of the diagnostic contact lens in its on-eye position, an over-refraction is performed: two or more test lenses are disposed sequentially before the patient's eye to determine a power curve with which the anterior surface of the central portion could be formed to provide optimal near and far vision for the patient.

According to another feature of the present invention, the standard diagnostic contact lens is selected from a plurality of standard diagnostic contact lenses each having an annular portion with a concave cornea-fitting posterior surface and each having a central portion with a predetermined convex anterior surface (of known value) and a concave aspherical posterior surface of a respective predetermined eccentricity. Preferably, the eccentricity of the concave aspherical posterior surface of each of the standard diagnostic contact lenses is between approximately 0.70 and approximately 1.00. Also, the concave cornea-fitting posterior surface of one or more of the standard diagnostic contact lenses may be aspherical with an eccentricity between about 0.45 and about 0.65.

According to a further feature of the present invention, each of the plurality of standard diagnostic contact lenses is tested on the cornea of the patient and the one lens is selected which is the flattest lens that gives acceptable distance vision.

According to an additional feature of the present invention, the method further comprises the step of providing a lens blank having a posterior side substantially identical in part to the concave cornea-fitting posterior surface and in part to the concave aspherical posterior surface of predetermined eccentricity. An anterior side of the lens blank is machined to produce the power curve determined by the method.

A multifocal contact lens customized for a patient comprises, in accordance with the present invention, an annular portion with an annular cornea-fitting posterior surface, an edge bevel at an annular periphery of the annular portion, and a central portion connected to the annular portion. The central portion has a concave aspherical posterior surface of a given eccentricity. The central portion has a convex anterior surface with a power curve selected by aligning, off center on the patient's cornea, a diagnostic contact lens having a posterior side with portions substantially identical to the cornea-fitting posterior surface and the concave aspherical posterior surface of the customized bifocal lens and by disposing a series of test lenses before the patient's eye upon alignment of the diagnostic contact lens in an off-center position on the patient's cornea, to determine the power curve. The customized multifocal lens also comprises a transition junction connecting the cornea-fitting posterior surface and the concave aspherical posterior surface.

According to another feature of the present invention, a bifocal contact lens customized for a patient comprises an annular portion with an aspheric annular cornea-fitting posterior surface having a standardized eccentricity between about 0.45 and about 0.65, an edge bevel at an annular periphery of the annular portion, and a central portion connected to the annular portion, the central portion having a concave aspherical posterior surface of a standardized eccentricity between approximately 0.70 and approximately 1.00, the central portion also having a convex anterior surface with a power curve customized to the patient. A transition junction connects the cornea-fitting posterior surface and the concave aspherical posterior surface.

The instant invention recognizes the difficulty of centering contact lenses. However, instead of struggling to achieve corneal centering, as all conventional fitting techniques attempt, the instant method obviates the difficulty by assuming that the greatest majority of fitted bifocal lenses need not be centered on the cornea at all. In a method in accordance with the present invention, the diagnostic lens positions itself in its natural position. Because the finished lens has exactly the same back surface design as the diagnostic lens, there is no need to center either the diagnostic lens or the finished product, which should position the same way as the diagnostic lens.

A method in accordance with the present invention recognizes that each cornea is different and, instead of molding or fitting a lens precisely to the eye so that the lens is centered, the instant contact lens preparation technique selects among a fixed number or prescribed standard fitting or diagnostic lenses and then modifies the anterior surface only in order to achieve an optimal bifocal or multifocal vision. This method can change differential powers of the two aspheric zones without affecting the fit.

As described herein, the concave aspheric posterior surface of the central zone has an eccentricity greater than the eccentricity of the concave cornea fitting posterior surface of the annular area of the lens. In a preferred embodiment, at the transition junction, the power of the multifocal lens is approximately the same immediately on both sides of the junction, i.e., in those areas of the central portion and the annular portion of the multifocal lens nearest the transition junction. It is noted that in most instances, the central portion of the multifocal lens will be the visual area; however, in certain instances, the annular portion of the lens may also provide vision, depending on how the lens aligns on the cornea.

Because the central zone of a lens manufactured in accordance with the present invention is aspheric, it has a multiplicity of refractive powers. These powers are least plus or most minus at the vertex and progressively become more plus or less minus from the vertex to the end of the central zone.

Whenever one refracts over such a lens on the eye using spherical ophthalmic lenses, the patient subjectively chooses that ophthalmic lens power combined with the multiplicity of lens powers in the aspheric central zone of the contact lens which provides the best acuity of vision at both far distance and near distance. There is a cortical interpretation of the independent images to determine the best acceptable summation of images.

DETAILED DESCRIPTION

Figure 1:
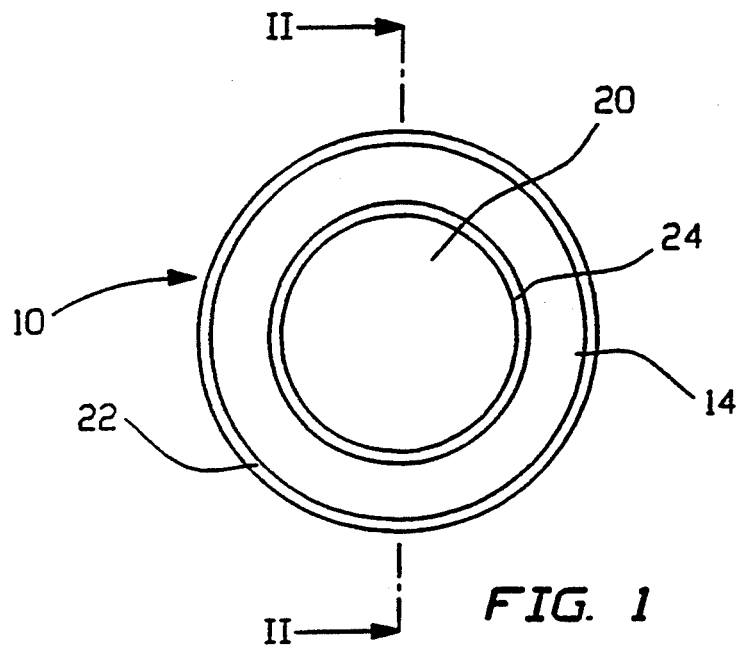
FIG. 1 is a schematic rear elevational view of a diagnostic contact lens in accordance with the present invention.
Figure 2:
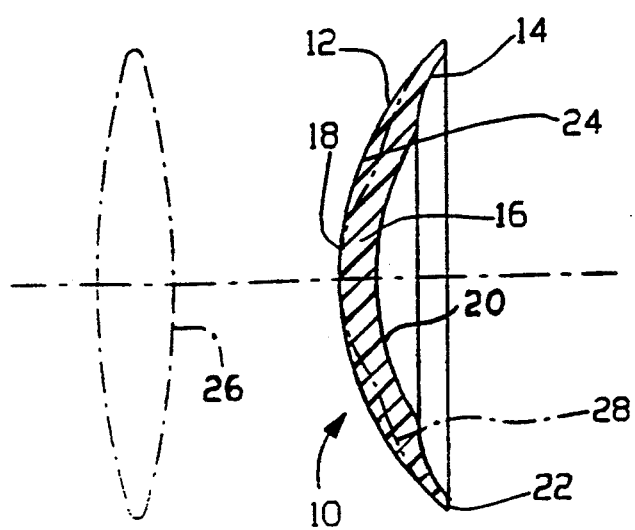
FIG. 2 is a cross-sectional view taken along line II—II in FIG. 1, showing in phantom lines an ophthalmic lens positioned in front of the diagnostic lens for fitting purposes.

A method for use in manufacturing a customized contact lens utilizes a diagnostic or fitting lens 10 illustrated in FIGS. 1 and 2. Lens 10 is a standard diagnostic contact lens 10 having an annular portion 12 with a concave cornea-fitting posterior surface 14. Lens 10 also has a central portion 16 with a predetermined convex anterior surface 18 and a concave aspherical posterior surface 20 of predetermined eccentricity. The eccentricity of aspherical posterior surface 20 of central portion 16 is preferably between approximately 0.70 and approximately 1.00. In addition, cornea-fitting posterior surface 14 may be aspherical with an eccentricity between about 0.45 and about 0.65.

Lens 10 additionally has an edge bevel 22 at an annular periphery of annular portion 12 and a transition junction 24 where the central zone connecting cornea-fitting posterior surface 14 of annular portion 12 and aspherical posterior surface 20 of central portion 16 meet.

In fitting a patient with a multifocal contact lens, diagnostic lens 10 is placed on the cornea of the patient's eye so that cornea-fitting posterior surface 14 is in substantial contact with the cornea. Lens 10 is allowed to align itself with the cornea in an off-center position. Upon an alignment of diagnostic contact lens 10 in the off-center position, a series of conventional spherical ophthalmic test lenses 26 (FIG. 2) are disposed before the lens 10 on the patient's eye to determine a power curve 28 (FIG. 1) with which anterior surface 18 of central portion 16 can be formed to provide optimal near and far vision for the patient.

An eccentricity between about 0.45 and about 0.65 for cornea-fitting posterior surface 14 is in accordance with the aspheric topographical characteristics of the human cornea. To optimize the fitting of lens 10 to any particular patient's cornea, lens 10 is selected from a kit of standard diagnostic contact lenses, such as lens 10, each having annular portion 12 with concave cornea-fitting posterior surface 14. Each lens 10 also has central portion 16 with predetermined convex anterior surface 18 and concave aspherical posterior surface 20 of predetermined eccentricity between approximately 0.70 and approximately 1.00. The annular portion 12 of each diagnostic lens 10 in the kit has a respective concave profile different from the profiles of the other lenses in the diagnostic or fitting kit. Most of the lenses 10 in the kit have annular cornea-fitting posterior surfaces 14 which are aspherical with eccentricities between about 0.45 and about 0.65.

The patient is fitted first with a diagnostic or fitting contact lens 10 having a posterior surface 14 which substantially matches the cornea of the patient about the iris. Of course, precise matching is generally undesirable, because space is required for tear flow, etc.

Two or more different standard diagnostic contact lenses 10 may be tested on the cornea of the patient. Preferably, the one lens is selected which is the flattest lens that gives acceptable distance vision.

Upon the selection of a suitable diagnostic lens 10 and determination of the appropriate power curve 28 for the final lens, a lens blank is selected (generally by a lens production laboratory) which is substantially identical to the diagnostic lens 10. Accordingly, the lens blank has annular portion 12 with concave cornea-fitting posterior surface 14 which is preferably aspheric with an eccentricity between about 0.45 and about 0.65. The lens blank also has central portion 16 with predetermined convex anterior surface 18 and aspherical posterior surface 20 of eccentricity between approximately 0.70 and approximately 1.00.

The anterior surface of the selected lens blank may be molded or machined, more specifically, lathed to produce power curve 28. Alternatively, the posterior surface of the lens blank or the entire lens, may be molded.

A customized or fitted multifocal contact lens made in accordance with the lens manufacturing detailed herein is substantially identical to a selected diagnostic lens 10 used on the patient, except that the anterior surface 18 of the customized bifocal contact lens has a power curve 28 determined by the fitting process where the diagnostic lens 10 is allowed to align itself with the cornea in an off-center position and where a series of conventional spherical opthalmic test lenses 26 are disposed before the off-center diagnostic lens 10 on the patient's eye to determine power curve 28.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for use in preparing a customized multifocal contact lens, comprising the steps of:
   providing a standard diagnostic contact lens having an annular portion with a concave cornea-fitting posterior surface, said diagnostic contact lens also having a central portion with a predetermined convex anterior surface and a concave aspherical posterior surface of predetermined eccentricity;
   placing said diagnostic contact lens on the cornea of a patient's eye so that said fitting surface is in substantial contact with the cornea;
   allowing said diagnostic contact lens to align itself with the cornea in an off-center position; and
   upon aligning of said diagnostic contact lens in said off-center position, disposing a series of test lenses before the patient's eye to determine a power curve with which said anterior surface of said central portion could be formed to provide optimal near and far vision for the patient.

2. The method defined in claim 1 wherein said step of providing a standard diagnostic contact lens includes the steps of:
   providing a plurality of standard diagnostic contact lenses each having an annular portion with a concave cornea-fitting posterior surface, said diagnostic contact lenses each having a central portion with a predetermined convex anterior surface and a concave aspherical posterior surface of a respective predetermined eccentricity; and
   selecting one of said standard diagnostic contact lenses.

3. The method defined in claim 2 wherein the eccentricity of the concave aspherical posterior surface of each of said plurality of standard diagnostic contact lenses is between approximately 0.70 and approximately 1.00.

4. The method defined in claim 3 wherein the concave cornea-fitting posterior surface of each of said plurality of standard diagnostic contact lenses is aspherical.

5. The method defined in claim 4 wherein the concave cornea-fitting posterior surfaces of said standard contact lenses have an eccentricity between about 0.45 and about 0.65.

6. The method defined in claim 2 wherein said step of selecting includes the steps of testing each of said plurality of standard diagnostic contact lenses on the cornea of the patient and selecting one of said plurality of standard diagnostic contact lenses which is the flattest lens that gives acceptable distance vision.

7. The method defined in claim 1 wherein said predetermined eccentricity is between approximately 0.70 and approximately 1.00.

8. The method defined in claim 7 wherein said concave cornea-fitting posterior surface is aspherical.

9. The method defined in claim 8 wherein said concave cornea-fitting posterior surface has an eccentricity between about 0.45 and about 0.65.

10. The method defined in claim 1 wherein said concave cornea-fitting posterior surface is aspherical.

11. The method defined in claim 10 wherein said concave cornea-fitting posterior surface has an eccentricity between about 0.45 and about 0.65.

12. The method defined in claim 1, further comprising the steps of providing a lens blank a posterior side substantially identical in part to said concave cornea-fitting posterior surface and in part to said concave aspherical posterior surface of predetermined eccentricity, machining an anterior side of said lens blank to produce said power curve.

13. A multifocal contact lens customized for a patient, comprising:
   an annular portion with an aspheric annular cornea-fitting posterior surface having a standardized eccentricity between about 0.45 and about 0.65;
   a central portion connected to said annular portion, said central portion having a concave aspherical posterior surface of a standardized eccentricity between 0.70 and 1.00, said central portion also having a convex anterior surface with a power curve customized to the patient; and
   a transition junction connecting said cornea-fitting posterior surface and said concave aspherical posterior surface.

14. A multifocal contact lens customized for a patient, comprising:
   an annular portion with an annular aspheric cornea-fitting posterior surface having a first standard eccentricity;
   a central portion connected to said annular portion, said central portion including a concave aspherical posterior surface having a second standard eccentricity, said second eccentricity being different from said first standard eccentricity, said central portion also having a convex anterior surface with a power curve having a first part for correcting distance vision and a second part for correcting near vision; and a transition junction connecting said cornea-fitting posterior surface and said concave aspherical posterior surface.

15. The lens defined in claim 14 wherein said cornea-fitting posterior surface has an eccentricity between about 0.45 and about 0.65.

16. The lens defined in claim 15 wherein said concave aspherical posterior surface has an eccentricity between about 0.70 and about 1.00.

17. The lens defined in claim 14 further comprising an edge bevel at an annular periphery of said annular portion.

* * * * *